US005264269A

United States Patent [19]

Kakiuchi et al.

[11] Patent Number: 5,264,269

[45] Date of Patent: Nov. 23, 1993

[54] WATER-DISINTEGRATABLE CLEANING ARTICLE IN LAMINATED SHEET FORM

[75] Inventors: Shusuke Kakiuchi; Makoto Ishii; Seiko Ikoma, all of Tochigi; Atsuo Nakae, Saitama; Seizo Maeshima; Masakazu Furukawa, both of Tochigi, all of Japan

[73] Assignee: Kao Corporation, Tokyo, Japan

[21] Appl. No.: 571,410

[22] Filed: Aug. 23, 1990

[30] Foreign Application Priority Data

Sep. 21, 1989 [JP] Japan .................................. 1-246184
Jun. 13, 1990 [JP] Japan .................................. 2-156245

[51] Int. Cl.$^5$ ........................ A47L 13/17; B32B 3/30; B32B 7/12

[52] U.S. Cl. .................................... 428/156; 428/172; 428/212; 428/219; 428/220; 428/289; 428/290; 156/219; 156/220; 156/209; 15/104.93; 15/209.1

[58] Field of Search ............... 428/156, 172, 290, 289, 428/212, 219, 220; 15/104.93, 209 R; 206/210, 812; 156/219, 220, 209; 252/90, 91; 604/374, 375; 424/402, 404

[56] References Cited

U.S. PATENT DOCUMENTS

| | | | |
|---|---|---|---|
| 3,846,158 | 11/1974 | Vasilyadis | 15/104.93 |
| 3,881,210 | 5/1975 | Drach | 15/104.93 |
| 3,965,519 | 6/1976 | Hermann | 15/104.93 |
| 4,096,311 | 6/1978 | Pietreniak | 15/104.93 |
| 4,154,883 | 5/1979 | Elias | 428/172 |
| 4,309,469 | 1/1982 | Varona | 15/104.93 |
| 4,481,243 | 11/1984 | Allen | 428/172 |
| 4,537,807 | 8/1985 | Chan | 206/812 |
| 4,741,944 | 5/1988 | Jackson | 15/104.93 |
| 4,978,565 | 12/1990 | Pigneul | 428/156 |
| 5,055,216 | 10/1991 | Johnson | 252/90 |

FOREIGN PATENT DOCUMENTS

| | | | |
|---|---|---|---|
| 0112654 | 3/1986 | European Pat. Off. . | |
| 0372388 | 6/1990 | European Pat. Off. . | |
| 54-104963 | 8/1979 | Japan . | |
| 61-296159 | 12/1986 | Japan . | |
| 63-50600 | 3/1988 | Japan . | |
| 50600 | 3/1988 | Japan | 15/209 R |
| 7008692 | 12/1970 | Netherlands | 15/104.93 |

*Primary Examiner*—Ellis P. Robinson
*Assistant Examiner*—Nasser Ahmad
*Attorney, Agent, or Firm*—Birch, Stewart, Kolasch & Birch

[57] ABSTRACT

A water-disintegrable cleaning article in a laminated sheet form comprising a laminated sheet prepared by sandwiching an inner sheet in between outer sheets, embossing the resultant laminate, and impregnating the embossed laminate with a water-containing cleaning agent. The cleaning article is provided with a difference in the content of a water-soluble binder between both sides of each of the outer sheets, with the side having a higher water-soluble binder content facing the inner sheet on each side thereof.

14 Claims, 1 Drawing Sheet

WATER-DISINTEGRATABLE CLEANING ARTICLE IN LAMINATED SHEET FORM

BACKGROUND OF THE INVENTION

The present invention relates to a water-disintegrable cleaning article in a laminated sheet form.

Cleaning the articles in a laminated sheet form, such as paper towel and sanitary tissue paper, are used for cleaning hard surfaces in a living room, a kitchen, a toilet room, etc. or for cleaning hands or anal region.

Most of the above-described cleaning articles in a laminated sheet form are manufactured by laminating a plurality of thin sheets to lamination to provide a thickness appropriate for wiping a surface to be cleaned, applying a binder by spraying or coating to the cleaning surface of an outer sheet, i.e., the outer surface thereof, to provide a strength capable of withstanding cleaning work, and subjecting the laminate to embossing to bond the plurality of laminated sheets together.

The thus produced cleaning articles in a laminated sheet form are used as they are or after impregnation the same with a cleaning agent, a germicide or the like. The embossing not only plays the role of bonding the laminated sheets together, but also exerts such effects as that of providing the laminated sheet with desired bulkiness and soft hand and that of ensuring excellent sliding during wiping of a surface to be cleaned.

These cleaning articles in a laminated form are put on top of the other or folded and then put on top of the other before being incorporated into a plastic container, a bag or the like to prepare a final product. Such a product may suffer from peeling of the sheets bonded together by embossing when the folded article is spread out or during cleaning work. Especially, a water-disintegratable cleaning article produced by impregnating a water-disintegratable laminated sheet containing a water soluble binder with a cleaning agent having a high water content is likely to suffer from the above-described problem of peeling.

Accordingly, an object of the present invention is to provide a water-disintegrable cleaning article free from peeling of the laminated sheets when the folded article is spread out or during cleaning work. Since such a water-disintegrable cleaning article can easily be disposed of by water washing afte" use, it has been used as a toilet stool cleaner, particularly for wiping hard surfaces of the floor and the stool of a toilet. However, the currently available commercial toilet stool cleaner comprises an ordinary paper simply impregnated with a highly concentrated alcohol solution, so that it has a high germicidal activity but is unsatisfactory from the viewpoint of detergency. The paper impregnated with a highly concentrated alcohol solution is relatively good for cleaning up contaminants derived from sebum or excreta but is insufficient particularly for cleaning up contaminants derived from dust etc., deposited on the floor, the outer periphery of the stool and the tank of a toilet. Water is necessary to clean up the above-described contaminants. However, when a paper like a general toilet paper is simply wet with water, the structure of the paper is disintegrated, so that its utility thereof as a cleaning article is remarkably lowered.

A water-disintegratable surface cleaning article impregnated with an aqueous solution is also known from literature. For example, Japanese Patent Laid-Open No. 296159/1986 discloses a carrageenan-bonded, water-disintegratable paper impregnated with an aqueous solution of a salt such as sodium chloride or calcium chloride, Japanese Patent Laid-Open No. 04963/1979 discloses a water-disintegratable skin cleaning cloth comprising a polyvinyl alcohol-bonded, water-disintegratable paper impregnated with boric acid or an aqueous boric acid solution, and Japanese Patent Laid-Open No. 50600/1988 discloses a water-disintegratable paper comprising a water-disintegratable paper prepared by sticking fiber sheets partially fused with a heat-fusible fiber on both sides of a common toilet paper-like water-disintegratable paper and impregnated with an aqueous solution. In case of the above-described Japanese Patent Laid-Open Nos. 296159/1986 and 104963/1979, a large amount of binder is necessary to prepare cleaning articles having a strength capable of withstanding the cleaning work. On the other hand, in the case of the Japanese Patent Laid-Open No. 50600/1988, since a water-insoluble resin is used, the water-disintegratability, is insufficient, so that when the water stream is weak, there is a risk that the water pipe will be clogged.

Accordingly, the second object of the present invention is to provide a water-disintegratable cleaning article which has a strength sufficient to withstand cleaning work, is excellent in detergency as well as in the water-disintegratable property and suitable particularly for cleaning the floor and stool of a toilet.

It has been found that cleaning of some plastic articles, particularly toilet stools made of ABS acrylonitrile/butadiene/styrene copolymer), with a cleaning article often causes the toilet stool to be cracked depending upon the kind of the cleaning agents to be incorporated. Accordingly, the third object of the present invention is to provide a water-disintegratable cleaning article in a laminated sheet form which produces no damage to the plastic, is excellent in detergency and can give a favorable gloss to the surface to be cleaned.

SUMMARY OF THE INVENTION

The present inventors have made extensive and intensive studies with a view to obviating the above-described first problem. As a result, they have found that the problem relates to the amount of a water-soluble binder present on both sides of an outer sheet, and that the problem can be resolved by rendering the water-soluble binder content of the side thereby facing the inner sheet higher than that of the other side thereof, which has led to the completion of the present invention.

Specifically, the present invention provides a water-disintegratable cleaning article in a laminated sheet form comprising a laminated sheet prepared by sandwiching an inner sheet in between outer sheets, embossing the resultant laminate and impregnating the embossed laminate with a cleaning agent containing 30% or more of water, wherein there is provided a difference in the content of a water-soluble binder between both sides of each of the outer sheets and the side thereof having a higher water-soluble binder content faces the inner sheet on each side thereof.

DESCRIPTION OF THE PREFERRED EMBODIMENTS

Figure 1A:
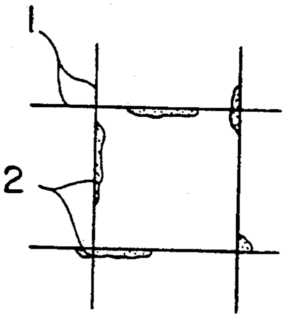
FIGS. 1A, 1B and 1C are schematic diagrams showing, the criteria for evaluation of a water-disintegratability.

There is no particular limitation on the kind of fibers for use in the formation of the sheet to be used for producing the water-disintegratable cleaning article in a laminated sheet form according to the present invention, and examples thereof include wood pulp fibers, non-wood vegetable fibers, rayon fibers, and synthetic fibers such as polyester fibers. The sheet is prepared by subjecting the described fibers to the conventional dry or wet paper making process.

The length, surface state, basis weight, etc., of the fiber as well have an effect on the strength of the sheet. In general, a beaten fiber having a fiber length of 0.01 to 5 mm, preferably 1 to 5 mm is favorably used.

The basis weight of the sheet to be used as the inner layer in the present invention and that of the sheet to be used as the outer layer in the present invention are preferably 5 to 100 g/m$^2$ and 5 to 50 g/m$^2$, respectively, from the viewpoint of the sheet strength during cleaning work and the flexibility of the sheet. The basis weight of the inner sheet is still more preferably 15 to 100 g/m$^2$, particularly preferably 15 to 50 g/m$^2$ while the basis weight of the outer sheet is still preferably 10 to 40 g/m$^2$.

The binder content on each side of the outer sheet can be varied by various methods, such as one which comprises spraying a binder onto one side of the sheet during sheet making, or one which comprises coating one side of the sheet with a binder by means of coating rolls and drying the coating. However, the method for varying the binder content is not limited thereto.

In the outer sheet, the ratio of the binder content of one side thereof having a higher binder content to that of the other side thereof having a lower binder content is preferably 1.1/1 to 2.5/1, particularly preferably 1.2/1 to 2/1.

Any binder may be used in the outer sheet as long as it exhibits a strength appropriate for cleaning work.

Examples of the water-soluble binders include polyvinyl alcohol, polysaccharide derivatives (alkali metal salts of carboxymethylcellulose, carboxyethylcellulose, carboxymethylated starch, etc.), synthetic polymers (alkali metal salts of polyacrylic acid, polymethacrylic acid, a copolymer of acrylic acid with methacrylic acid, a copolymer of acrylic acid or methacrylic acid with an alkyl ester of acrylic acid or an alkyl ester of methacrylic acid, etc.) and natural polymers (glue, casein, guar gum, xanthan gum, dielan gum, gum tragacanth, or pectin).

Moreover, it is also possible to use certain types of binders (a water-soluble binder which is insoluble in a small amount of water but soluble in a large amount of water) which are crosslinkable with an inorganic salt. These types of binders may be applied by spraying or coating a binder crosslinked with an inorganic salt onto a sheet. Alternatively, in the case of a wet cleaning article, the binders may be applied by first spraying or coating an uncrosslinked binder only onto a sheet, and then impregnating the sheet with a liquid active substance having added thereto an inorganic salt capable of crosslinking the binder. Specific examples of the crosslinked binders include a binder system described in Japanese Patent Laid-Open No. 104963/1979 wherein a certain kind of bond between polyvinyl alcohol and boric acid or its salt is utilized and a binder system described in Japanese Patent Laid-Open No. 296159/1986 wherein a certain kind of bond between carrageenan and a specific salt is utilized.

The crosslinked binder system used in the present invention is preferably one comprising a water-soluble polymer having a carboxyl group as the anionic group among the above-described water-soluble polymers, and as a counter ion a metal selected from among alkaline earth metals, manganese, zinc, cobalt and nickel (a mixed counter ion comprising the above-described polyvalent metal and an alkali metal may be used) (calcium salt of carboxymethylcellulose, zinc salt of carboxymethylcellulose, iron salt of carboxymethylcellulose, calcium salt of acrylic acid, etc.). The water-soluble polymer having a carboxyl group is particularly preferably carboxymethylcellulose. The crosslinked binder system having a carboxymethylcellulose is very advantageous because it can easily satisfy the wet strength and water-disintegratable properties in a wide range of the amount of use.

The binder is used in an amount of 1 to 30%, preferably 1 to 15%, more preferably 1 to 10%, particularly preferably 1 to 7% based on the dry weight of the outer sheet.

Any type of sheets can be employed as an inner sheet as long as it can give the feeling of thickness during cleaning. It may be a non-binder sheet containing no binder or a sheet provided with the above-described binder for the purpose of forming a sheet skeleton.

The laminated sheet according to the present invention is prepared by sandwiching at least one inner sheet in between outer sheets so as to cause the side of the outer sheet having a higher binder content to face the inner sheet on each side thereof and embossing the resultant laminate.

Examples of the embossing technique include steel-to-steel embossing, steel-to-rubber embossing, steel-to-paper embossing, nested embossing and tip-to tip embossing. The effect of retaining an embossed configuration in the wet state is best attained when any one of steel-to-steel embossing, steel-to-rubber embossing and steel-to-paper embossing is applied. The depth of the embossed pattern is preferably 0.3 to 2 mm.

The embossing brings about lamination of the sheets on top of the other and imparts favorable bulkiness and soft hand to the laminated sheet. Further, it enables the hard surface to be smoothly cleaned without application of excessive force, so that fuzzing and dusting can be reduced. Further, since the protruded portion of the emboss concentrically gives a stress to the contaminated surface, it functions so that the contaminant can be effectively scratched off, which contributes to an enhancement in the cleaning effect.

The laminated sheet thus prepared was impregnated with a cleaning agent.

It has been believed in the art that when a water-disintegratable paper containing a water-soluble binder is impregnated with an aqueous solution, a cleaning article capable of withstanding cleaning work cannot be prepared without use of a water-soluble binder in an unprofitably large amount. However, this is thought to reside in the fact that research has hitherto been conducted on an unlaminated single sheet impregnated with an aqueous solution containing no water-soluble solvent or containing only a very small amount of a water-soluble solvent. The present inventors have made studies and, as a result, have found that the impregnation of the above-described laminated sheet with an aqueous solution containing a suitable amount of a water-soluble solvent enables a cleaning article having a strength enough to withstand cleaning work to be prepared even when the amount of the water-soluble binder used is the usual one. Specifically, the laminated sheet is impregnated with 100 to 250% (owf), based on the weight of the laminated sheet, of a cleaning solution containing 8 to 50% by weight, preferably 10 to 40% by weight of a water soluble solvent and 92 to 50% by weight, preferably 90 to 60% by weight of water.

When the amount of the water-soluble solvent is less than 8% by weight, not only it is difficult to prepare a cleaning article having a strength capable of withstanding cleaning work but also the emboss weakens and disappears. Also when the water content is less than 50%, the capability for cleaning a dust contaminant and a water-soluble contaminant is lowered. When the amount of the cleaning solution incorporated in the sheet is less than 100% (owf), the cleaning effect is insufficient while when the amount exceeds 250% (owf), it becomes difficult to maintain the strength of the cleaning article.

Examples of the water-soluble solvent include monohydric lower alcohols such as ethanol, methanol and propanol, glycols such as ethylene glycol, diethylene glycol, polyethylene glycol, propylene glycol, dipropylene glycol, butylene glycol and hexylene glycol, and mono- or diethers of the above-described glycol with a lower alcohol such as methanol, ethanol, propanol or butanol, esters of the above-described glycol with a lower fatty acid and further polyhydric alcohols such as glycerin and sorbitol. They may be used alone or in a combination of two or more. The basic formulation comprises a water-soluble solvent and water. If necessary, it is possible to add ingredients such as anionic surfactants, nonionic surfactants, cationic surfactants and amphoteric surfactants, alkaline agents, germicides, perfumes and deodorants.

In many cases, a surfactant is incorporated in an amount of 0.01 to 5% by weight for the purpose of enhancing the cleaning effect. Examples of the surfactant include amphoteric surfactants such as amine oxide having an alkyl group having 8 to 22 carbon atoms, sulfobetaines or hydroxysulfobetaines having an alkyl group having 8 to 22 carbon atoms and carbobetaines having an alkyl group having 8 to 22 carbon atoms; anionic surfactants such as a salt of an alkylsulfuric acid having 8 to 22 carbon atoms and 1 to 30 moles of ethylene oxide added thereto, a salt of an α-sulfofatty acid having 8 to 22 carbon atoms, a salt of an alkyl(or alkenyl)succinic acid and a paraffinsulfonate having 8 to 22 carbon atoms; nonionic surfactants such as an ether of a polyoxy-alkylene having an alkyl group having 8 to 22 carbon atoms (in many cases, polyoxyethylene, polyoxypropylene or a mixture of both of them) with a glycol; and cationic surfactants such as a quaternary ammonium salt having one alkyl group having 8 to 14 carbon atoms.

In the above-described solvent-containing aqueous solution system suitable for use as a water-containing cleaning agent in the present invention, when the amount of the water-soluble binder is 1 to 7% based on the weight of the fiber sheet, it is possible to prepare a cleaning article having a wet tensile strength (200 g/25 mm or more) and a surface friction strength (60 strokes or more) enough to withstand practical use.

Some plastic articles, for example, a lamp shade made of polycarbonate and a toilet stool made of ABS (acrylonitrile/butadiene/styrene copolymer), may suffer from damage when cleaned with a water-disintegratable cleaning article impregnated with the above-described cleaning agent. Studies have revealed that the damage is caused by an alkylene oxide adduct type surfactant and a certain kind of a monohydric alcohol or a polyhydric alcohol and its derivative as a solvent contained in the cleaning agent.

The present inventors have further conducted extensive and intensive studies with a view to solving the above-described problems and, as a result, have found that a cleaning agent comprising a particular surfactant and two particular solvents does not damage plastic, is excellent in detergency and imparts a favorable gloss to the surface to be treated.

Specifically, a cleaning agent having the following composition is suitable as a cleaning agent to be incorporated into the laminated sheet:

(a) 0.01 to 5% by weight of at least one surfactant selected from the group consisting of alkyl glycosides, sugar fatty acid esters and amphoteric surfactants;

(b) 1 to 30% by weight of at least one water-soluble solvent selected from the group consisting of monohydric alcohols, polyhydric alcohols and their derivatives having a vapor pressure of 2 mm Hg or higher at 20° C.

(c) 0.5 to 15% by weight of at least one water-soluble solvent selected from the group consisting of ethylene glycol, propylene glycol, butanediol, glycerin and hexylene glycol; and (d) about 92 to 50% by weight of water.

Among the components (a), the alkyl glycoside and sugar fatty acid ester are sugar type nonionic surfactants and prepared by dehydrative condensation of a monosaccharide having a degree of polymerization of 1 to 10, a polysaccharide or a complex carbohydrate with an alcohol having 8 to 18 carbon atoms or a fatty acid. The sugar type nonionic surfactant is particularly preferably a compound represented by the following general formula (I) or (II):

$$R-O-(Z)_x \qquad (I)$$

$$(R_1-\underset{\underset{O}{\|}}{C}-O)_n-Z \qquad (II)$$

In the above-described formulae, R is an alkyl or alkenyl group having 8 to 18 carbon atoms, preferably 10 to 14 carbon atoms, $R_1$ is an alkyl or alkenyl group having 7 to 17 carbon atoms, preferably 9 to 13 carbon atoms, x is 1 to 10, preferably 1.2 to 3, n is 1 to 2 and Z is a sugar residue. Examples of the monosaccharide in the sugar residue include glucose, fructose, galactose, xylose, mannose, lyxose and arabinose and a mixture thereof, and examples of the disaccharide or higher polysaccharide in the sugar residue include maltose, xybiose, isomaltose, cellobiose, gentibiose, lactose, ,sucrose, nigerose, solanose, raffinose, gentianose and melezitose and mixtures thereof. Glucose and fructose in the case of the monosaccharide and maltose and sucrose in the case of the disaccharide or higher polysaccharide are preferred as a sugar material from the viewpoint of availability and low cost.

Examples of the amphoteric surfactant as other component (a) include amino acid, amido-amino acid, carbobetaine and sulfobetaine amphoteric surfactants. Betaine type surfactants represented by the following general formulae (III) and (IV) are particularly preferred from the viewpoint of solution stability:

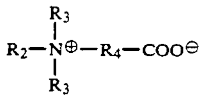
(III)

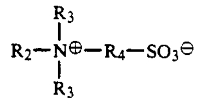
(IV)

In the above-described formulae, $R_2$ is an alkyl or alkenyl group having 8 to 18 carbon atoms, preferably 10 to 14 carbon atoms, $R_3$ is an alkyl group having 1 to 4 carbon atoms, preferably 1 to 2 carbon atoms and $R_4$ is an alkylene or hydroxyalkylene group having 1 to 6 carbon atoms.

Among the surfactants, the alkylene oxide adduct type surfactant damages the surface of plastics. Therefore, the surfactant as the component (a) used in the present invention is limtied to one not having any polyoxyalkylene group.

The component (a) is incorporated in an amount of 0.01 to 5% by weight, preferably 0.1 to 5% by weight based on the composition. When the amount of incorporation of the component (a) is less than 0.01% by weight, insufficient detergency is attained. On the other hand, when the amount exceeds 5% by weight, there occur problems on stains accompanying wiping, stickiness, etc.

In the present invention, two solvents are used. One of them is one or more solvents (b) selected from a monohydric alcohol, a polyhydric alcohol and its derivative having a vapor pressure of 2 mm Hg (20° C.) or above and used in an amount of 1 to 30% by weight. Specifically, examples of the monohydric alcohol include ethyl alcohol, isopropyl alcohol, propanol, butanol, sec-butanol and tert-butanol. Examples of the polyhydric alcohol and its derivative include ethylene glycol monomethyl ether, propylene glycol monomethyl ether, dimethyl glycol, diethyl glycol and dimethyl diglycol. The solvents having a vapor pressure of 2 mm Hg (20° C.) or more bring about no damage to polycarbonate or ABS plastics. Further, these solvents are useful for removing oleaginous stains derived from sebum deposited on the hard surface. When the amount of incorporation of the component (b) is less than 1% by weight, the solvent exhibits an insufficient effect of removing an oleaginous stain. On the other hand, when the amount of incorporation exceeds 30% by weight, there occur problems of odor, stickiness, risk of fire, etc. The amount of incorporation of the component (b) is preferably 5 to 15% by weight.

The other solvent is at least one solvent (c) selected from ethylene glycol, propylene glycol, butanediol, glycerin and hexylene glycol and incorporated in an amount of 0.5 to 15% by weight. Most of the solvents having a vapor pressure of less than 2 mm Hg (20° C.) attack plastics. It has been proven that the solvents used as the component (c) do not attack polycarbonate or ABS plastics although they have a vapor pressure of 1 mm Hg (20° C.) or less and are nonvolatile. Examples of the function of the above-described solvents include an improvement in the effect of glazing of the hard surface. When the amount of incorporation of the component (c) is less than 0.5% by weight, insufficient glazing effect can be attained. On the other hand, when the amount is 15% by weight or more, the amount of the component remaining on the hard surface becomes large, which brings about problems such as stains accompanying wiping and stickiness. The amount of incorporation of the component (c) is preferably 2 to 10% by weight.

The present invention will now be described by way of the following Examples, though the present invention is not limited to these only.

EXAMPLE 1

A toilet paper-like non-binder sheet having a basis weight of 25 g/m$^2$ was prepared from a conifer kraft paper as a raw material beaten so as to exhibit a CSF (Canadian standard freeness) of 680 ml by making use of the conventional paper making machine.

One side of the prepared non-binder sheet was coated with sodium salt of a water-soluble carboxymethylcellulose (CMC 2200; a product of Daicel Chemical Industries, Ltd.) so that the content thereof on that side is 5% (1.25 g/m$^2$) based on the weight of the sheet. The coated sheet was dried to prepare an outer sheet containing sodium salt of CMC.

The outer sheet was subjected to the surface analysis of iron by means of an X-ray analyzer through the utilization of the crosslinking reaction between iron and CMC. As a result, it was found that the CMC content ratio between both sides of the outer sheet was 1.93/1 in terms of the ratio of the CMC content of the coated side to that of the non-coated side.

Separately, a toilet paper-like non-binder sheet for use as an inner layer having a basis weight of 40 g/m$^2$ was prepared through the use of a similar paper making machine.

The inner sheet thus prepared was sandwiched in between the above-prepared outer sheets so as to cause the coated side of each of the outer sheets to face the inner sheet on each side thereof and the resultant laminate was embossed (steel to steel embossing; 0.9 mm in the height of the protruded portion; the same shall apply to the following Examples and Comparative Examples) to prepare a laminated sheet having a three-layered structure and a basis weight of 90 g/m$^2$ (25/40/25).

The resultant laminated sheet was impregnated with the following cleaning agent in an amount of 200% by weight based on the weight of the laminated sheet to prepare, a wet water-integratable cleaning article.

| Composition of cleaning agent | |
|---|---|
| • polyoxyethylene alkyl ether<br>average length of alkyl chain: 12<br>average number of moles of<br>added EO: 7 | 0.5% by weight |
| • benzalkonium chloride | 0.01% by weight |
| • ethanol | 46% by weight |
| • diethanolamine | 3% by weight |
| • water | the balance |

The properties of the water-disintegratable cleaning article in a sheet form thus prepared were evaluated by the following methods.

<Bonding strength between outer sheet and inner sheet>

The wet water-disintegratable cleaning article prepared above was cut into a strip having a width of 25 mm and a length of 150 mm. The outer sheets were peeled off the inner sheet at one end in the longitudinal direction of the strip by above 15 mm. The peeled portion of each of the outer sheet and the inner sheet was fixed respectively to the two testpiece clamps and the bonding strength between the outer sheet and the inner sheet was measured at a tensile rate of 300 mm/min.

<Peeling between laminated sheets>

Wet water-disintegratable cleaning articles (size: 30 cm×30 cm) were each folded into four, and the 10 folded cleaning articles were put on top of the other and placed in a container. The container was handed over to 50 housewives (panelists) for use in the cleaning of places associated with the residence to evaluate the peeling of the laminated sheets when the folded article is spread out during cleaning.

The criteria for the evaluation are as follows.

- ○: all the panelists (50 panelists) answered that no peeling of the laminated sheet was observed.
- ◎: more than 80% of the panelists (40 to 49 panelists) answered that no peeling of the laminated sheet was observed.
- Δ: 60% or more and less than 80% of the panelists (30 to 39 panelists) answered that no peeling of the laminated sheet was observed.
- x: less than 60% of the panelists (29 panelists or less) answered that no peeling of the laminated sheet was observed.

The results are shown in Table 1.

COMPARATIVE EXAMPLE 1

A wet water-disintegratable cleaning article was prepared in the same manner as that of Example 1 by sandwiching the inner sheet in between the outer sheets, each prepared in Example 1, except that the non-coated side of each of the outer sheets was caused to face the inner sheet on each side thereof and the resultant laminate was embossed (steel to steel embossing) The evaluation of the cleaning article thus prepared was conducted in the same manner as that of Example 1.

The results are shown in Table 1.

TABLE 1

| | Peeling between laminated sheets | Bonding strength between outer and inner sheets (g/25 mm) |
|---|---|---|
| Ex. 1 | ○ | 14 |
| Comp. Ex. 1 | x | 7 |

EXAMPLE 2

A toilet paper-like non-binder sheet having a basic weight of 25 g/m$^2$ was prepared from a conifer kraft paper as a raw material beaten so as to exhibit a CSF (Canadian standard freeness) of 680 ml by making use of the conventional paper making machine.

One side of the prepared non-binder sheet was coated by spraying with sodium salt of a water-soluble carboxymethylcellulose (FT-3; a product of Sanyo-Kokusaku Pulp co., Ltd.) dissolved in water in a concentration of 3% so that the content thereof at that side is 5% (1.25 m/m$^2$) based on the weight of the sheet. The coated sheet was dried to prepare an outer sheet containing sodium salt of CMC.

The outer sheet was subjected to measurement of the CMC content ratio of the spray-coated side to the non-spray-coated side in the same manner as that of Example 1 and found to be 1.3/1.

On the other hand, a toilet paper-like non-binder sheet for use as an inner layer having a basis weight of 40 g/m$^2$ was prepared through the use of a similar paper making machine.

The inner sheet thus prepared was sandwiched in between the above-prepared outer sheets so as to cause the spray-coated side of each of the outer sheets to face the inner sheet on each side thereof and the resultant laminate was embossed (steel to steel embossing) to prepare a laminated sheet having a three-layered structure and a basis weight of 90 g/m$^2$ (25/40/25).

The resultant laminated sheet was impregnated with the following cleaning agent in an amount of 200% by weight based on the weight of the laminated sheet to prepare a wet water-disintegratable cleaning article.

| Composition of cleaning aqent | |
|---|---|
| • polyoxyethylene alkyl ether average length of alkyl chain: 12 average number of moles of added EO: 7 | 0.5% by weight |
| • benzalkonium chloride | 0.01% by weight |
| • calcium chloride | 3% by weight |
| • ethanol | 10% by weight |
| • propylene glycol | 7% by weight |
| • ion exchanged water | the balance |

The properties of the water-disintegratable cleaning article in a sheet form thus prepared were evaluated in the same manner as that of Example 1. The wet tensile strength and surface friction strength of the cleaning article were evaluated by the following methods.

<Wet tensile strength>

A water-disintegratable cleaning article in a sheet form impregnated with a cleaning agent was cut into a strip having a width of 25 mm and a length of 100 mm. Then, the strip was immediately subjected to measurement of the breaking strength by making use of a universal compression tensile tester (RTM-25 manufactured by Orientec Corp.) under conditions of a tensile rate of 300 mm/min and a testpiece clamping distance of 50 mm.

<Surface friction strength>

A tile plate having joints (joint width: 3 mm) comprising tiles having a size of 24 mm×24 mm arranged in 5 rows in the vertical direction and in 15 rows in the lateral direction was prepared, and the surface of the tile plate was wiped up in the lateral direction with a water-integrable cleaning article in a sheet form impregnated with a cleaning agent under a load of 1 kg/cm, at a stroke of 30 cm.

The number of repetitive strokes necessary for a fluffy mass to remain on the tile plate due to fuzzing of the water-integrable cleaning article in a sheet form impregnated with a cleaning agent were regarded as the surface friction strength by supposing that one reciprocation of a stroke of 30 cm was one stroke.

The results are shown in Table 2.

COMPARATIVE EXAMPLE 2

A wet water-disintegratable cleaning article was prepared in the same manner as that of Example 2 by sandwiching the inner sheet in between the outer sheets, each prepared in Example 2, except that the non-spray-coated side of each of the outer sheets was caused to face the inner sheet on each side thereof and the resultant laminate was embossed (steel to steel embossing). The above-described evaluation was conducted on the cleaning article thus prepared.

The results are shown in Table 2.

TABLE 2

| | Peeling between laminated sheets | Bonding strength between outer and inner sheets (g/25 mm) | Wet tensile strength (g/25 mm) | Surface friction strength (number of strokes) |
|---|---|---|---|---|
| Ex. 2 | ○ | 13 | 420 | 100 |
| Comp. Ex. 2 | Δ | 7 | 430 | 109 |

EXAMPLE 3

An aqueous CMC/$Ca(CH_2COO)_2$ solution prepared by dissolving a mixture of sodium salt of carboxymethylcellulose (CMC1330; a product of Daicel Chemical Industries, Ltd.) with calcium acetate in water in respective concentrations of 3% and 0.75% was sprayed on only one side of a web (basis weight: 20 $g/m^2$) of a disintegrated and laminated conifer fluff pulp so that the amount of the aqueous solution is 20% (4 $g/m^2$) based on the web. The coated web was dried to prepare an outer sheet containing calcium salt of CMC (crosslinked binder).

The above-described outer sheet was subjected to measurement of the CMC content ratio of the spray-coated side to the non-spray-coated side in the same manner as that of Example 1 and found to be 1.2/1.

Separately, polyvinyl alcohol (PVA-110; a product of Kuraray Co., Ltd.) was sprayed on one side of a web (basis weight: 20 $g/m^2$) of a disintegrated and laminated conifer fluff pulp only for the purpose of forming a sheet skeleton and then dried to prepare an inner sheet.

The inner sheet thus prepared was sandwiched in between the above-prepared outer sheets so as to cause the spray-coated side of each of the outer sheets to face the inner sheet on each side thereof and the resultant laminate was embossed (steel to steel embossing) to prepare a laminated sheet having a three-layered structure and a basis weight of 90 $g/m^2$ (20/50/20).

The resultant laminated sheet was impregnated with the same cleaning agent as that used in Example 2 in an amount of 170% by weight based on the weight of the laminated sheet to prepare a wet water-disintegratable cleaning article.

The properties of the cleaning article in a sheet form thus prepared were evaluated in the same manner as that of Example 2.

The results are shown in Table 3.

COMPARATIVE EXAMPLE 3

A wet water-disintegratable cleaning article was prepared in the same manner as that of Example 3 by sandwiching the inner sheet in between the outer sheets, each prepared in Example 3, except that the non-spray-coated side of each of the outer sheets was caused to face the inner sheet on each side thereof and the resultant laminate was embossed (steel to steel embossing). The cleaning article thus prepared was evaluated in the same manner as that of Example 3.

The results are shown in Table 3.

TABLE 3

| | Peeling between laminated sheets | Bonding strength between outer and inner sheets (g/25 mm) | Wet tensile strength (g/25 mm) | Surface friction strength (number of strokes) |
|---|---|---|---|---|
| Ex. 3 | ○ | 12 | 380 | 88 |
| Comp. Ex. 3 | x | 7 | 370 | 85 |

EXAMPLES 4 TO 7 AND COMPARATIVE EXAMPLES 4 TO 12

Laminated sheets prepared in the following Preparation Examples 1 to 5 were impregnated with cleaning agents having compositions specified in Table 4 to prepare water-disintegratable cleaning articles.

The laminated sheets prepared in Preparation Examples 1 to 5 were cut into a size of 20 cm×20 cm and impregnated with the cleaning agents in an amount of 200% (owf) based on the weight of the sheet. The resultant cleaning articles were evaluated by the following methods.

PREPARATION EXAMPLES ON LAMINATED SHEET

Preparation Example 1

A toilet paper-like water-disintegratable sheet A having a basis weight of 25 $g/m^2$ and another sheet B having a basis weight of 40 $g/m^2$ were prepared from a conifer kraft, pulp as a raw material beaten so as to exhibit a CSF value of 680 ml by making use of a cylinder Yankee machine.

The prepared water-disintegratable sheet (A) having a basis weight of 25 $g/m^2$ was spray-coated with a water-soluble binder comprising sodium salt of carboxymethylcellulose (CMC 2280; a product of Daicel Chemical Industries, Ltd.) dissolved in water in a concentration of 0.5% so that the CMC content is 5% based on the weight of the sheet. The coated sheet was dried to prepare a CMC-containing sheet (C).

The two CMC-containing sheets (C) having a basis weight of 25 $g/m^2$ thus prepared were used as the outer layer while a water-disintegratable sheet (B) having a basis weight of 40 $g/m^2$ was used as the inner layer to prepare a laminate. The surface coated with the binder of the outer layer faced the inner layer. The resultant laminate was embossed to prepare a laminated sheet of a three-layered structure having a basis weight of 90 $g/m^2$ (25/40/25).

Preparation Example 2

The water-disintegratable sheet (A) having a basis weight of 25 $g/m^2$ prepared in Preparation Example 1 was spray-coated with a water-soluble binder comprising sodium salt of carboxymethylcellulose (CMC 2280; a product of Daicel Chemical Industrial, Ltd.) dissolved in water in a concentration of 0.5% so that the CMC content is 3% based on the weight of the sheet. The coated sheet was further spray-coated with a 1% aqueous calcium chloride solution so that the calcium chloride contant is 2% based on the weight of the sheet. The resultant laminate was dried to prepare a sheet (D) containing CMC and a calcium ion.

The two sheets(D) containing CMC and a calcium ion and having a basis weight of 25 $g/m^2$ thus prepared were used as the outer layer while a water-disintegratable sheet (B) having a basis weight of 40 $g/m^2$ prepared in Preparation Example 1 was used as the inner layer to prepare a laminate. The surface coated with the binder of the outer layer faced the inner layer. The resultant laminate was embossed to prepare a laminated sheet of a three-layered structure having a basis weight of 90 g/m² (25/40/25).

PREPARATION EXAMPLE 3 (COMPARATIVE)

The two water-disintegratable sheets(A) having a basis weight of 25 g/m² prepared in Preparation Example 1 were used as the outer layer while a water-disintegratable sheet (B) having a basis weight of 40 g/m² prepared in Preparation Example 1 was used as the inner layer to prepare a laminate. The resultant laminate was embossed to prepare a laminated sheet of a three-layered structure having a basis weight of 90 g/m² (25/40/25).

PREPARATION EXAMPLE 4 (COMPARATIVE)

A toilet paper-like sheet (E) having a basis weight of 8 g/m² was prepared from a mixed raw material comprising 93% by weight of a beaten conifer kraft pulp used in Preparation Example 1 and a 7% by weight of a synthetic pulp of polyethylene [SWP ® E-400; a product of Mitsui Petrochemical Industries, Ltd.] by making use of a cylinder Yankee machine. Similarly, a water-disintegratable sheet (F) having a basis weight of 74 g/m² was prepared from the above-described conifer kraft pulp as a raw material.

Two sheets (E) and one sheet (F) prepared above were used as the outer layer and the inner layer, respectively, to prepare a laminate. The resultant laminate was heat-treated by means of a flat heat roller at 150° C. to prepare a laminated sheet of a three-layered structure having a basis weight of 90 g/m² (8/74/84).

PREPARATION EXAMPLE 5 (COMPARATIVE)

Two sheets (E) prepared in Preparation Example 4 and one sheet (F) prepared in Preparation Example 4 were used as the outer layer and the inner layer, respectively, to prepare a laminate. The resultant laminate was heat-embossed by means of a heat roller having unevennesses at 150° C. to prepare a laminated sheet of a three-layered structure having a basis weight of 90 g/m² (8/74/8).

The emboss provided in the Preparation Examples 1 to 3 and 5 was a steel match emboss having an emboss pattern depth of 0.9 mm.

<Wet tensile strength>

The wet tensile strength was measured by the method described in Example 2.

<Surface friction strength>

The surface friction strength was measured also by the method described in Example 2.

<Practicality evaluation by panelists>

The cleaning agent-impregnated sheets thus prepared as a cleaning article was handed over to 50 housewives (panelists) for use in the cleaning a toilet to evaluate the strength of the cleaning articles.

The criteria for the evaluation are as follows:

- ∘: at least 80% of the panelists (40 panelists) answered that the strength was excellent.
- ⓐ: 70 to 80% of the panelists (35 to 39 panelists) answered that the strength was excellent.
- Δ: 50 to 70% of the panelists (25 to 34 panelists) answered that the strength was excellent.
- x: less than 50% of the panelists (24 panelists or less) answered that the strength was excellent.

<Water-disintegratable property>

Figure 1B:
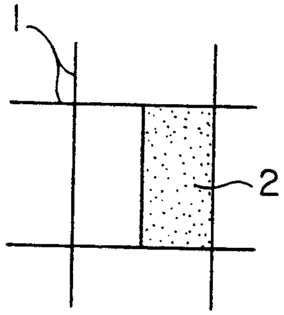
Figure 1C:
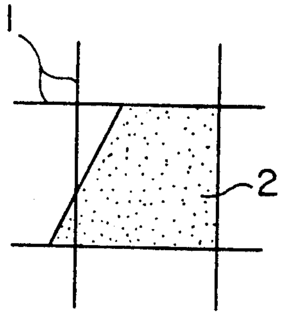

200 ml of tap water (20° C.) was placed in a 3-l beaker and stirred (300 rpm) with a stirrer. A cleaning article cut into a size of 50 mm×50 mm was put into this system. The resultant dispersion was poured at once into a sieve having a size of mm×10 mm 60 sec and 90 sec after the cut cleaning article was put into the system to observe the state of the cleaning article caught in a net 1 of the sieve. The criteria for the evaluation are as follows:

- ∘: a small amount of the cleaning article 2 remains in lines or crossed portions of the net of the sieve (see FIG. 1A).
- Δ: the cleaning article 2 remains to such an extent that a half or less of the meshes of one sieve are covered (see FIG. 1B).
- x: the cleaning article 2 remains to such an extent that more than half of the meshes are covered (see FIG. 1C).

<Detergency (dirt caused by deposition of dust)>

A white tile (20 cm×20 cm) was allowed to stand on a shelf in a toilet room for 3 months. The surface of the shelf was mildly wiped with a cleaning article by hand to evaluate the detergency against dirt caused by deposition of dust.

The criteria for the evaluation are as follows:

- ∘: a cleaning stripe was hardly produced.
- Δ: a cleaning stripe was produced to a small extent.
- x: a cleaning stripe was produced to a considerable extent.

<Detergency (oleaginous dirt)>

Beef tallow was applied to a black tile (20 cm×20 cm), and the surface of the tile was well wiped with a tissue paper. Water was repelled by a coating of the beef tallow provided on the surface of the tile. The surface was cleaned with a cleaning article, and water was spread on the surface of the black tile to compare the water repellency of the surface with that in the case of a normal tile.

The criteria for the evaluation are as follows:

- ∘: the water repellency was equal to that of an uncoated tile.
- Δ: a small amount of the beef tallow coating remained unremoved.
- x: 30% or more of the beef tallow coating partially remained unremoved.

The evaluation results are given in Table 1.

TABLE 4

| Ex. No. | Laminated sheet | Cleaning agent | Wet tensile strength (g/25 mm) | Surface friction strength (strokes) | Evaluation of practicality | Water-disintegrable property after 60 sec | Water-disintegrable property after 90 sec | Detergency: dirt caused by deposition of dust | Detergency: oleaginous dirt |
|---|---|---|---|---|---|---|---|---|---|
| Comp. Ex. 4 | Prep. Ex. 1 | Softanol 70**/ 0.5/99.5 | 50 | 10 | x | ∘ | ∘ | ∘ | x |
| Comp. Ex. 5 | Prep. Ex. 1 | Softanol 70/ethanol/water 0.5/5/94.5 | 90 | 21 | Δ | ∘ | ∘ | ∘ | Δ |
| Ex. 4 | Prep. | Softanol 70/ethanol/water | 220 | 62 | ∘ | ∘ | ∘ | ∘ | ∘ |

TABLE 4-continued

| Ex. No. | Laminated sheet | Cleaning agent | Wet tensile strength (g/25 mm) | Surface friction strength (strokes) | Evaluation of practicality | Water-disintegrable property | | Detergency | |
|---|---|---|---|---|---|---|---|---|---|
| | | | | | | after 60 sec | after 90 sec | dirt caused by deposition of dust | oleaginous dirt |
| | Ex. 1 | 0.5/20/79.5 | | | | | | | |
| Ex. 5 | Prep. Ex. 2 | Softanol 70/ethanol/water 0.5/10/89.5 | 180 | 54 | (Δ) | ∘ | ∘ | ∘ | Δ |
| Ex. 6 | Prep. Ex. 2 | Softanol 70/ethanol/water 0.5/30/69.5 | 520 | 125 | ∘ | ∘ | ∘ | ∘ | ∘ |
| Ex. 7 | Prep. Ex. 2 | Softanol 70/ethanol/water 0.5/45.5/50 | 800 | 221 | ∘ | ∘ | ∘ | ∘ | ∘ |
| Comp. Ex. 7 | Prep. Ex. 2 | Softanol 70/ethanol/water 0.5/70/29.5 | 920 | 317 | ∘ | Δ | ∘ | Δ | ∘ |
| Comp. Ex. 8 | Prep. Ex. 3 | Softanol 70/ethanol 0.5/99.5 | 480 | 30 | x | ∘ | ∘ | x | ∘ |
| Comp. Ex. 9 | Prep. Ex. 3 | Softanol 70/ethanol/water 0.5/20/79.5 | 60 | 10 | x | ∘ | ∘ | ∘ | ∘ |
| Comp. Ex. 10 | Prep. Ex. 4 | Softanol 70/ethanol/water | 260 | 68 | ∘ | x | x | Δ | Δ |
| Comp. Ex. 11 | Prep. Ex. 4 | Softanol 70/ethanol/water 0.5/20/79.5 | 270 | 72 | ∘ | x | x | Δ | ∘ |
| Comp. Ex. 12 | Prep. Ex. 5 | Softanol 70/ethanol/water 0.5/20/79.5 | 220 | 63 | ∘ | x | x | ∘ | ∘ |

Note:
**Softanol 70: polyoxyethylene (average number of moles of E.O. added: 7) alkyl (average chain length: 12) ether

Results

The emboss of the cleaning article prepared in Comparative Example 9 disappeared during cleaning work. The emboss of the cleaning article prepared in Comparative Example 6 disappeared when hermetically sealed in an aluminum foil, stored at room temperature for 6 months and used for cleaning work.

By contrast, in Examples 4, 5, 6 and 7 wherein water-disintegratable cleaning articles of the present invention were used, the emboss did not disappear even when they were similarly stored at room temperature and stored for 6 months.

EXAMPLE 8

Cleaning agents (containing calcium chloride in an amount of 3%) listed in Tables 5 and 6 were prepared to evaluate damage to ABS resin, detergency and dirt residue uncleaned by the following methods.

<Method of evaluating damage to ABS resin>

Figure 2:
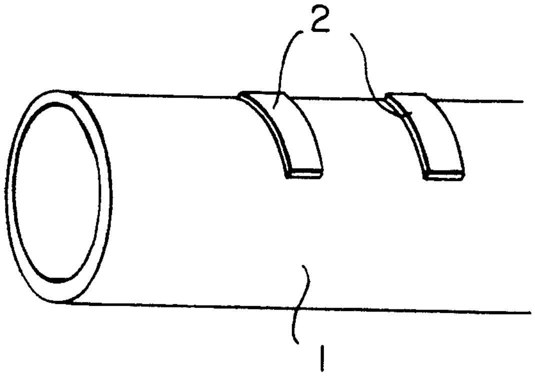
FIG. 2 is a schematic diagram showing a method of producing a strain in an ABS resin conducted in Example 8.
Figure 3:
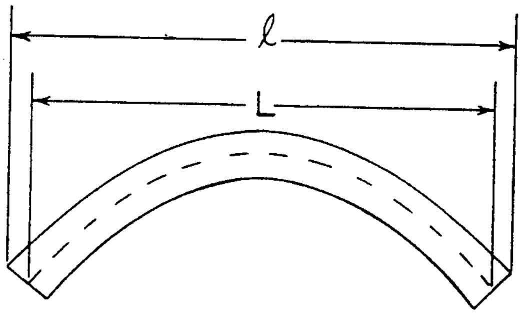
FIG. 3 is a cross-sectional view of a strained ABS resin.

A test piece of an ABS resin (Mitsubishi-Monsanto Co., Ltd.) having a size of 230 mm×35 mm×2 mm is fixed onto the surface of a polyvinyl chloride pipe having a diameter of 267 mm as shown in FIG. 2 to give a strain of 0.74% as shown in FIG. 3.

The strain is calculated by the following equation:

$$\text{Strain } (\%) = \frac{l - L}{L} \times 100$$

The strained ABS resin, i.e., stressed ABS resin, was cleaned 10 times (one reciprocation was regarded as one run) with the laminated sheet obtained in Example 2 weighing 1 g in the dry state impregnated with 1.7 g of an aqueous cleaning agent solution and allowed to stand at 20° C. and 65% RH for 24 hr to evaluate the damage to ABS resin.

The criteria for the evaluation are as follows:

∘: no abnormal phenomenon occurred.

x: cracking occurred.

<Method of evaluating dirt residue uncleaned>

The surface of a plastic was wiped five times to evaluate the dirt residue uncleaned. The criteria for evaluation are as follows:

∘: no double cleaning was needed.

Δ: a slight cleaning stain remained.

x: a cleaning stain remained.

<Method of evaluating glazing effect>

The surfaces of the plastic and the tile were cleaned to evaluate surface gloss. The criteria for evaluation are as follows:

∘: gloss was observed.

Δ: slight gloss was observed.

x: no gloss was observed.

<Method of evaluating detergency>

The floor, wall, door, sash, toilet stool, lighting equipment, etc. of a normal home were cleaned to evaluate the detergency. The criteria for the evaluation are as follows:

∘: 80% of the dirt was removed.

Δ: 20 to 50% of the dirt was removed.

x: scarcely any dirt was removed.

The evaluations of dirt residue uncleaned, glazing effect and detergency were conducted by impregnating a laminated sheet prepared in Example 22 (dry weight: 2.6 g) with 5.0 g of the cleaning agent and wiping the sheet.

The evaluation results are given in Table 1.

For comparison, the ingredients of the cleaning agent were varied, and the results are given in Table 6.

TABLE 5

| Ingredients of cleaning agent | (Examples) 1 | 2 | 3 | 4 | 5 | 6 | 7 | 8 | 9 | 10 |
|---|---|---|---|---|---|---|---|---|---|---|
| alkyl glycoside*1 | 1.0 | 0.5 | — | — | — | — | 0.5 | 0.5 | — | 0.5 |
| hydroxysulfobetaine*2 | — | — | 0.5 | 5.0 | — | — | 0.5 | — | 0.5 | 0.5 |
| carbobetaine*3 | — | — | — | — | 0.1 | 1.0 | — | 0.5 | 0.5 | 0.5 |
| ethanol (44 mmHg/20° C.) | 10.0 | 5.0 | — | 5.0 | 10.0 | — | 10.0 | — | — | 20.0 |
| isopropyl alcohol (32.4 mmHg/20° C.) | — | — | 5.0 | — | 10.0 | — | 5.0 | — | — | 5.0 |

TABLE 5-continued

| Ingredients of cleaning agent | (Examples) 1 | 2 | 3 | 4 | 5 | 6 | 7 | 8 | 9 | 10 |
|---|---|---|---|---|---|---|---|---|---|---|
| propylene glycol monomethyl ether (6.7 mmHg/20° C.) | — | 5.0 | — | 5.0 | — | 10.0 | — | 5.0 | 5.0 | 5.0 |
| ethylene glycol monomethyl ether acetate (2.0 mmHg/20° C.) | — | — | 5.0 | — | — | 5.0 | — | 2.0 | 2.0 | — |
| ethylene glycol (0.05 mmHg/20° C.) | — | — | — | 2.0 | — | — | 1.0 | — | — | — |
| propylene glycol (0.08 mmHg/20° C.) | 2.0 | — | — | — | — | 2.0 | 1.0 | — | — | 5.0 |
| 1,3-butanediol (0.06 mmHg/20° C.) | — | 3.0 | — | — | 15.0 | 3.0 | 1.0 | 10.0 | 5.0 | — |
| glycerin (<0.01 mmHg/20° C.) | — | — | 1.0 | — | — | — | 1.0 | — | — | — |
| ion-exchanged water | B*4 | B | B | B | B | B | B | B | B | B |
| damage to ABS resin | ○ | ○ | ○ | ○ | ○ | ○ | ○ | ○ | ○ | ○ |
| detergency | ○ | ○ | ○ | ○ | ○ | ○ | ○ | ○ | ○ | ○ |
| dirt residue uncleaned | ○ | ○ | ○ | ○ | ○ | ○ | ○ | ○ | ○ | ○ |
| glazing effect | ○ | ○ | ○ | ○ | ○ | ○ | ○ | ○ | ○ | ○ |

Note:
*1 The alkyl glycoside used is represented by the formula $RO(Z)_x$ wherein R is $C_{12}$, Z is a glucose residue and x is 1.4.
*2 hydroxysulfobetaine

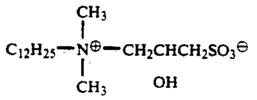

*3 carbobetaine

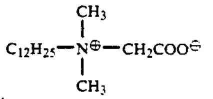

*4 the balance

TABLE 6

| Ingredients of cleaning agent | (Comparative Examples) 1 | 2 | 3 | 4 | 5 | 6 | 7 | 8 | 9 |
|---|---|---|---|---|---|---|---|---|---|
| alkyl glycoside (the same as that of the Examples) | 1.0 | 1.0 | — | — | — | — | 0.5 | — | — |
| hydroxysulfobetaine (the same as that of the Examples) | — | 1.0 | — | — | — | — | 1.0 | — | — |
| sodium alkylbenzenesulfonate*1 | — | — | 2.0 | — | — | — | — | 0.5 | 5.0 |
| polyoxyethylene alkyl ether*2 | — | — | — | 1.0 | 1.0 | 1.0 | — | 0.5 | 5.0 |
| ethanol (44 mmHg/20° C.) | 10.0 | 10.0 | 10.0 | — | 5.0 | 5.0 | — | | |
| diethyl diglycol (0.38 mmHg/20° C.) | — | — | — | — | 5.0 | — | — | — | — |
| propylene glycol (0.08 mmHg/20° C.) | — | — | 5.0 | 5.0 | — | — | 2.0 | — | — |
| dipropylene glycol (<0.01 mmHg/20° C.) | — | — | — | — | 5.0 | — | — | 2.0 | — |
| triethylene glycol (<0.01 mmHg/20° C.) | — | — | — | — | — | 5.0 | — | 2.0 | — |
| polyethylene glycol 400 (<0.01 mmHg/20° C.) | — | — | — | — | — | — | 7.0 | 2.0 | 0.5 |
| ion-exchanged water | ○ | ○ | ○ | ○ | ○ | ○ | ○ | ○ | ○ |
| damage to ABS resin | ○ | x | ○ | x | x | x | x | x | x |
| detergency | ○ | ○ | ○ | ○ | ○ | ○ | ○ | ○ | ○ |
| dirt residue uncleaned | ○ | ○ | Δ | ○ | ○ | ○ | ○ | ○ | ○ |
| glazing effect | x | x | ○ | ○ | ○ | ○ | ○ | ○ | Δ |

Note:
*1 average length of alkyl chain: 12
*2 average length of alkyl chain: 12
average number of moles of addition of ethylene oxide: 6

What is claimed is:

1. A water-disintegratable cleaning article in an embossed laminated sheet form comprising a laminated sheet prepared by:

sandwiching a paper inner sheet between two outer sheets each having an inner side and an outer side, integrating said sheets together using a cross-linkable binder system comprising a water-soluble polymer having a carboxyl group as the anionic group and a metal counterion, selected from the group consisting of alkaline earth metals, manganese, zinc, cobalt, nickel, and mixture of the above metals with an alkali metal, to strengthen the outer sheets to form a laminate;

embossing the resultant laminate to integrate said inner sheet with the two outer sheets; and impregnating said embossed laminate with a water-containing cleaning agent comprising 8 to 30% by weight of a water-soluble solvent and 92 to 50% by weight of water, said water-containing cleaning agent being incorporated in an amount of 100 to 250% based on the weight of said laminated sheet, wherein there is provided a difference in the content of said cross-linkable binder between said inner side and said outer side of each of said two outer sheets, and wherein said inner sides of each of said outer sheets facing said paper inner sheet on each side thereof have a higher content of said cross-linkable binder which has been applied by spraying or coating.

2. The water-disintegrable cleaning article in a laminated sheet form according to claim 1 wherein the basis weight of the outer sheet is 5 to 50 g/m² and the amount of the binder used is 1 to 30% by weight based on the dry weight of the outer sheet.

3. The water-disintegrable cleaning article in a laminated sheet form according to claim 1, which further comprises 0.01 to 5% by weight of a surfactant.

4. The water-disintegrable cleaning article in a laminated sheet form according to claim 3, wherein the water-containing cleaning agent comprises:

(a) 0.01 to 5% by weight of at least one surfactant selected from the group consisting of alkyl glycosides, sugar fatty acid esters and amphoteric surfactants;

(b) 1 to 30% by weight of at least one water-soluble solvent selected from the group consisting of monohydric alcohols, polyhydric alcohols and their derivatives having a vapor pressure of 2 mmHg or higher at 20° C.; and (c) 0.5 to 15% by weight of at least one water-soluble solvent selected from the group consisting of ethylene glycol, propylene glycol, butanediol, glycerin and hexylene glycol.

5. The water-disintegratable cleaning article in a laminated sheet form according to claim 1 wherein said crosslinkable binder system comprises the calcium salt of carboxymethylcellulose, the zinc salt of carboxymethylcellulose, the iron salt of carboxymethylcellulose, or the calcium salt of acrylic acid.

6. The water-disintegratable cleaning article in a laminated sheet form according to claim 1, wherein the basis weight of said inner sheet is 5 to 100 $g/m^2$ and the basis weight of each of said outer sheets is 5 to 50 $g/m^2$.

7. The water-disintegratable cleaning article in a laminated sheet form according to claim 6 wherein the basis weight of said inner sheet is 15 to 100 $g/m^2$ and the basis weight of each of said outer sheets is 10 to 40 $g/m^2$.

8. The water-disintegratable cleaning article in a laminated sheet form according to claim 7, wherein the basis weight of said inner sheet is 15 to 50 $g/m^2$.

9. The water-disintegratable cleaning article in a laminated sheet form according to claim 1 wherein the ratio of said crosslinkable binder system content of said inner side to said outer side of said outer sheet is 1.1:1 to 2.5:1.

10. The water-disintegratable cleaning article in a laminated sheet form according to claim 9 wherein said ratio is from 1.2:1 to 2:1.

11. The water-disintegratable cleaning article in a laminated sheet form according to claim 2 wherein said crosslinkable binder system is used in an amount of 1 to 15% based on the dry weight of said outer sheet.

12. The water-disintegratable cleaning article in a laminated sheet form according to claim 11 wherein said crosslinkable binder system is used in an amount of 1 to 10% based on the dry weight of said outer sheet.

13. The water-disintegratable cleaning article in a laminated sheet form of claim 12 wherein said binder is used in an amount of 1 to 7% based on the dry weight of said outer sheet.

14. A water-disintegratable embossed laminated cleaning sheet comprising:

a paper inner sheet;

two outer sheets, each having an inner side and outer side, wherein each of said inner sides of said two outer sheets is laminated to said inner sheet with a cross-linkable binder system, comprising a water-soluble polymer having a carboxyl group as the anionic group and a metal counterion selected from the group consisting of alkaline earth metals, manganese, zinc, cobalt, nickel and mixtures of the above with an alkali metal, to strengthen the outer sheets to form a laminated sheet, and wherein said inner sides have been coated or sprayed with said cross-linkable binder and have a higher content of said cross-linkable binder than said outer sides;

and a water-containing cleaning agent incorporated into said laminated sheet comprising 8 to 50% by weight of a water-soluble solvent and 92 to 50% by weight of water, and wherein said water-containing cleaning agent is incorporated in an amount of 100 to 250% based on the weight of said laminated sheet.

* * * * *